US012287594B2

(12) United States Patent
Kawasaki et al.

(10) Patent No.: US 12,287,594 B2
(45) Date of Patent: Apr. 29, 2025

(54) TRANSFER UNIT AND IMAGE FORMING APPARATUS INCLUDING SAME

(71) Applicant: KYOCERA Document Solutions Inc., Osaka (JP)

(72) Inventors: Kenichiro Kawasaki, Osaka (JP); Kazuhisa Hirahara, Osaka (JP); Takashi Kainuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/623,498

(22) Filed: Apr. 1, 2024

(65) Prior Publication Data

US 2024/0337969 A1 Oct. 10, 2024

(30) Foreign Application Priority Data

Apr. 7, 2023 (JP) ................................ 2023-062645

(51) Int. Cl.
*G03G 15/16* (2006.01)
*G03G 15/00* (2006.01)

(52) U.S. Cl.
CPC ..... *G03G 15/1615* (2013.01); *G03G 15/6529* (2013.01); *G03G 2215/00409* (2013.01); *G03G 2215/00679* (2013.01)

(58) Field of Classification Search
CPC ....................... G03G 15/1615; G03G 15/6529
USPC ......................... 399/297–299, 302, 306, 308
See application file for complete search history.

(56) References Cited

U.S. PATENT DOCUMENTS 10,126,688 B2 * 11/2018 Tokoro .............. G03G 15/1615

FOREIGN PATENT DOCUMENTS

JP 2012-159571 A 8/2012

* cited by examiner

*Primary Examiner* — Hoan H Tran
(74) *Attorney, Agent, or Firm* — Stein IP, LLC

(57) ABSTRACT

A transfer unit includes a seamless transfer belt, a plurality of transfer rollers, a backup roller, a plurality of pairs of first bearing holders, a pair of second bearing holders and a pair of sliders. Each of the sliders is reciprocated such that each of the first bearing holders slides on the corresponding one of the first step ribs to be reciprocated in a direction toward and away from the transfer belt and the second bearing holder slides on the second step rib to be reciprocated in the direction toward and away from the transfer belt. The first step rib arranged most upstream in the direction of travel of the transfer belt and the second step rib are arranged side by side in the axial direction of the transfer roller, and overlap each other when viewed in the axial direction.

6 Claims, 11 Drawing Sheets

TRANSFER UNIT AND IMAGE FORMING APPARATUS INCLUDING SAME

INCORPORATION BY REFERENCE

This application is based upon and claims the benefit of priority from the corresponding Japanese Patent Application No. 2023-062645 filed on Apr. 7, 2023, the entire contents of which are incorporated herein by reference.

BACKGROUND

The present disclosure relates to a transfer unit and an image forming apparatus which includes such a transfer unit.

A conventional transfer unit is disclosed in Patent Literature 1. The transfer unit includes a seamless transfer belt, a plurality of transfer rollers, a backup roller, a plurality of bearing holders and a slider. The transfer belt is moved along a direction in which a plurality of image carrying members are arranged. The transfer rollers are arranged opposite the image carrying members through the transfer belt, and sequentially transfer and stack, on the transfer belt, toner images formed on the outer circumferential surfaces of the image carrying members. The backup roller is provided on an upstream side relative to the transfer roller arranged most upstream in the direction of travel of the transfer belt so as to be in parallel with the transfer roller, and is extended parallel to the axis line of the transfer roller.

When the conventional technique is adopted, the size of an image forming apparatus is disadvantageously increased due to a mechanism which moves the transfer belt and the transfer rollers toward and away from each other.

SUMMARY

A transfer unit according to an aspect of the present disclosure includes a seamless transfer belt, a plurality of transfer rollers, a backup roller, a plurality of pairs of first bearing holders, a pair of second bearing holders and a pair of sliders. The transfer belt is moved along a direction in which a plurality of image carrying members are arranged. The transfer rollers are arranged opposite the image carrying members through the transfer belt, and sequentially transfer and stack, on the transfer belt, toner images formed on the outer circumferential surfaces of the image carrying members. The backup roller is provided on an upstream side relative to the transfer roller arranged most upstream in a direction of travel of the transfer belt so as to be in parallel with the transfer roller, and is extended parallel to an axis line of the transfer roller. Each of the pairs of first bearing holders rotatably support both ends of the corresponding one of the transfer rollers. The pair of second bearing holders rotatably support both ends of the backup roller. The pair of sliders are supported to be able to be reciprocated in the direction of travel of the transfer belt and support the pairs of first bearing holders and the pair of second bearing holders. Each of the sliders includes a plurality of first step ribs that slidably support the first bearing holders and a second step rib that slidably supports the second bearing holder. Each of the first step ribs includes a first inclination portion, a first upper portion and a first lower portion. The first inclination portion is inclined upward as the first inclination portion is extended to a downstream side in the direction of travel of the transfer belt. The first upper portion is extended from an upper end of the first inclination portion to the downstream side in the direction of travel of the transfer belt. The first lower portion is extended from a lower end of the first inclination portion to the upstream side in the direction of travel of the transfer belt. The second step rib includes a second inclination portion, a second upper portion and a second lower portion. The second inclination portion is inclined upward as the second inclination portion is extended to the downstream side in the direction of travel of the transfer belt. The second upper portion is extended from an upper end of the second inclination portion to the downstream side in the direction of travel of the transfer belt. The second lower portion is extended from a lower end of the second inclination portion to the upstream side in the direction of travel of the transfer belt. Each of the sliders is reciprocated such that each of the first bearing holders slides on the corresponding one of the first step ribs to be reciprocated in a direction toward and away from the transfer belt and the second bearing holder slides on the second step rib to be reciprocated in the direction toward and away from the transfer belt. The first step rib arranged most upstream in the direction of travel of the transfer belt and the second step rib are arranged side by side in an axial direction of the transfer roller, and overlap each other when viewed in the axial direction.

Further objects of the present disclosure and specific advantages obtained by the present disclosure will become apparent from the description of an embodiment described below.

DETAILED DESCRIPTION

Figure 1:
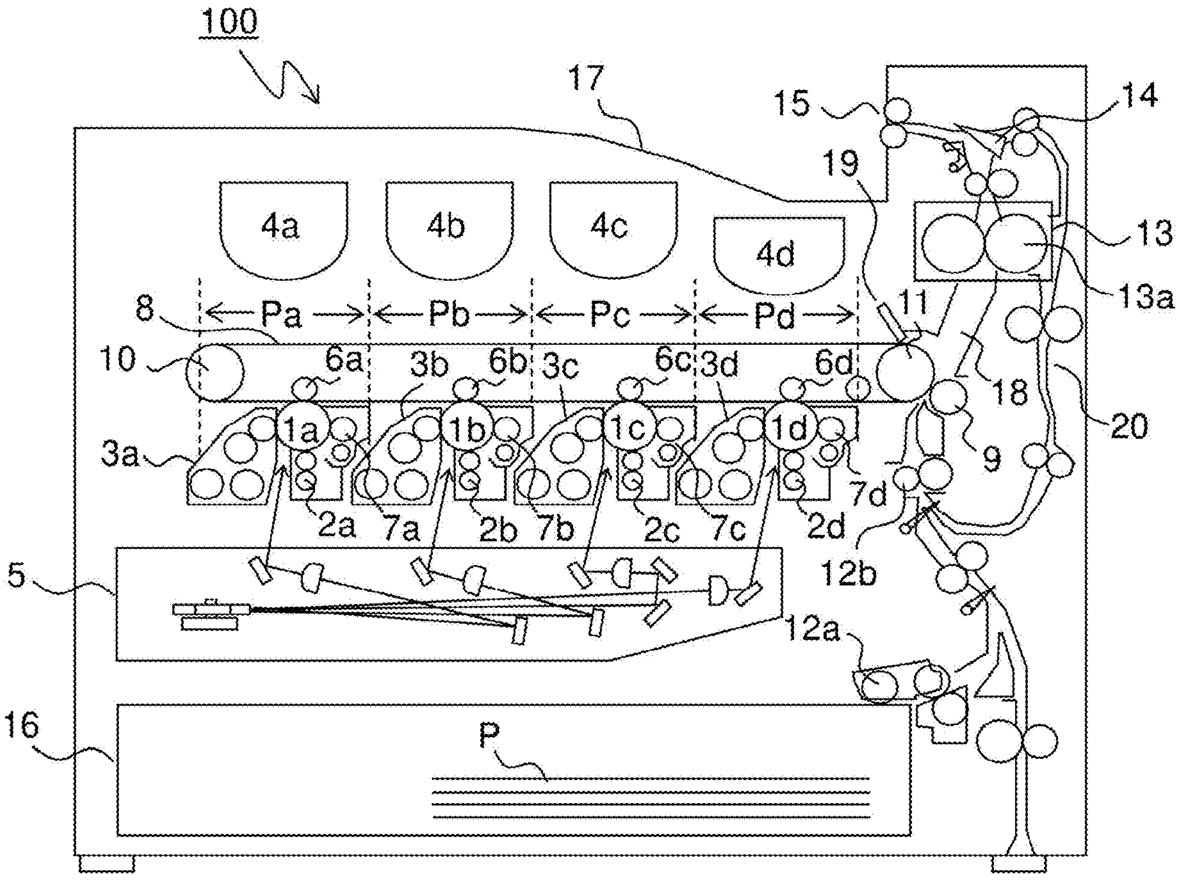
FIG. 1 is a schematic cross-sectional front view showing the configuration of an image forming apparatus 100 according to an embodiment of the present disclosure.

An embodiment of the present disclosure will be described below with reference to drawings. The present disclosure is not limited to details described below. FIG. 1 is a schematic cross-sectional view of an image forming apparatus 100 in which an intermediate transfer unit (transfer unit) 30 according to the present disclosure is included, and shows a tandem type color printer here. In the main body of the image forming apparatus 100, four image formation units Pa, Pb, Pc and Pd are provided sequentially from an upstream side in a conveyance direction (the left side in FIG. 1). These image formation units Pa to Pd are provided to correspond to images of four different colors (yellow, cyan, magenta and black), and individually perform steps of charging, exposure, development and transfer to sequentially form images of yellow, cyan, magenta and black.

In these image formation units Pa to Pd, photosensitive drums 1*a*, 1*b*, 1*c* and 1*d* which carry visible images (toner images) of the colors are provided, and an intermediate transfer belt 8 which is rotated by a drive device (not shown) in a counterclockwise direction in FIG. 1 is further provided adjacent to the image formation units Pa to Pd.

When image data is input from a host device such as a personal computer, charging devices 2*a* to 2*d* first uniformly charge the surfaces of the photosensitive drums 1*a* to 1*d*. Then, an exposure device 5 applies light according to the image data to form electrostatic latent images corresponding to the image data on the photosensitive drums 1*a* to 1*d*. Predetermined amounts of two-component developers (hereinafter also simply referred to as developers) containing the toners of the colors of cyan, magenta, yellow and black are charged by toner containers (not shown) into development devices 3*a* to 3*d*. The toners in the developers are supplied by the development devices 3*a* to 3*d* onto the photosensitive drums 1*a* to 1*d* and are electrostatically adhered thereto. In this way, the toner images corresponding to the electrostatic latent images formed by the exposure from the exposure device 5 are formed.

Then, an electric field is applied by primary transfer rollers 6*a* to 6*d* between the primary transfer rollers 6*a* to 6*d* and the photosensitive drums 1*a* to 1*d* at a predetermined transfer voltage, and the toner images of cyan, magenta, yellow and black on the photosensitive drums 1*a* to 1*d* are primarily transferred onto the intermediate transfer belt 8. The toners and the like which are left on the surfaces of the photosensitive drums 1*a* to 1*d* after the primary transfer are removed by cleaning devices 7*a* to 7*d*.

Transfer sheets P on which the toner images are to be transferred are stored in a sheet cassette 16 arranged in a lower part of the image forming apparatus 100, and the transfer sheet P is conveyed via a paper feed roller 12*a* and a registration roller pair 12*b* into a nip portion (secondary transfer nip portion) between the secondary transfer roller 9 provided adjacent to the intermediate transfer belt 8 and the intermediate transfer belt 8 with predetermined timing. The transfer sheet P on which the toner images have been secondarily transferred is conveyed to a fixing unit 13. The toners and the like which are left on the surface of the intermediate transfer belt 8 after the secondary transfer are removed by a cleaning device 19.

The transfer sheet P conveyed to the fixing unit 13 is heated and pressurized, the toner images are fixed to the surface of the transfer sheet P and a predetermined full-color image is formed. The transfer sheet P on which the full-color image has been formed is ejected to an ejection tray 17 by an ejection roller pair 15 without being processed (or after being distributed by a branch unit 14 to a reverse conveyance path 18 where images are formed on both sides).

Figure 2:
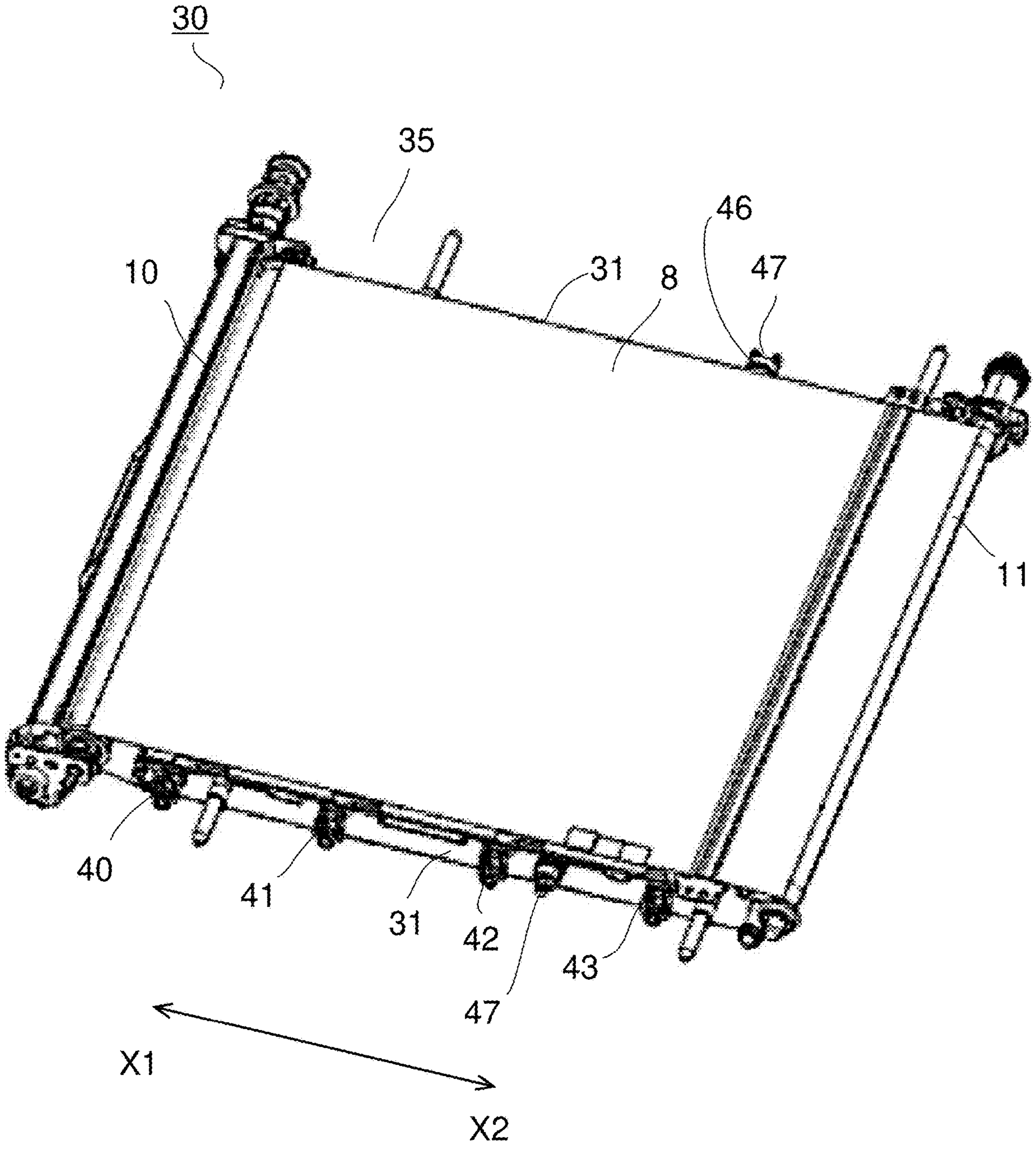
FIG. 2 is a perspective view showing an intermediate transfer unit 30 according to the embodiment of the present disclosure.
Figure 3:
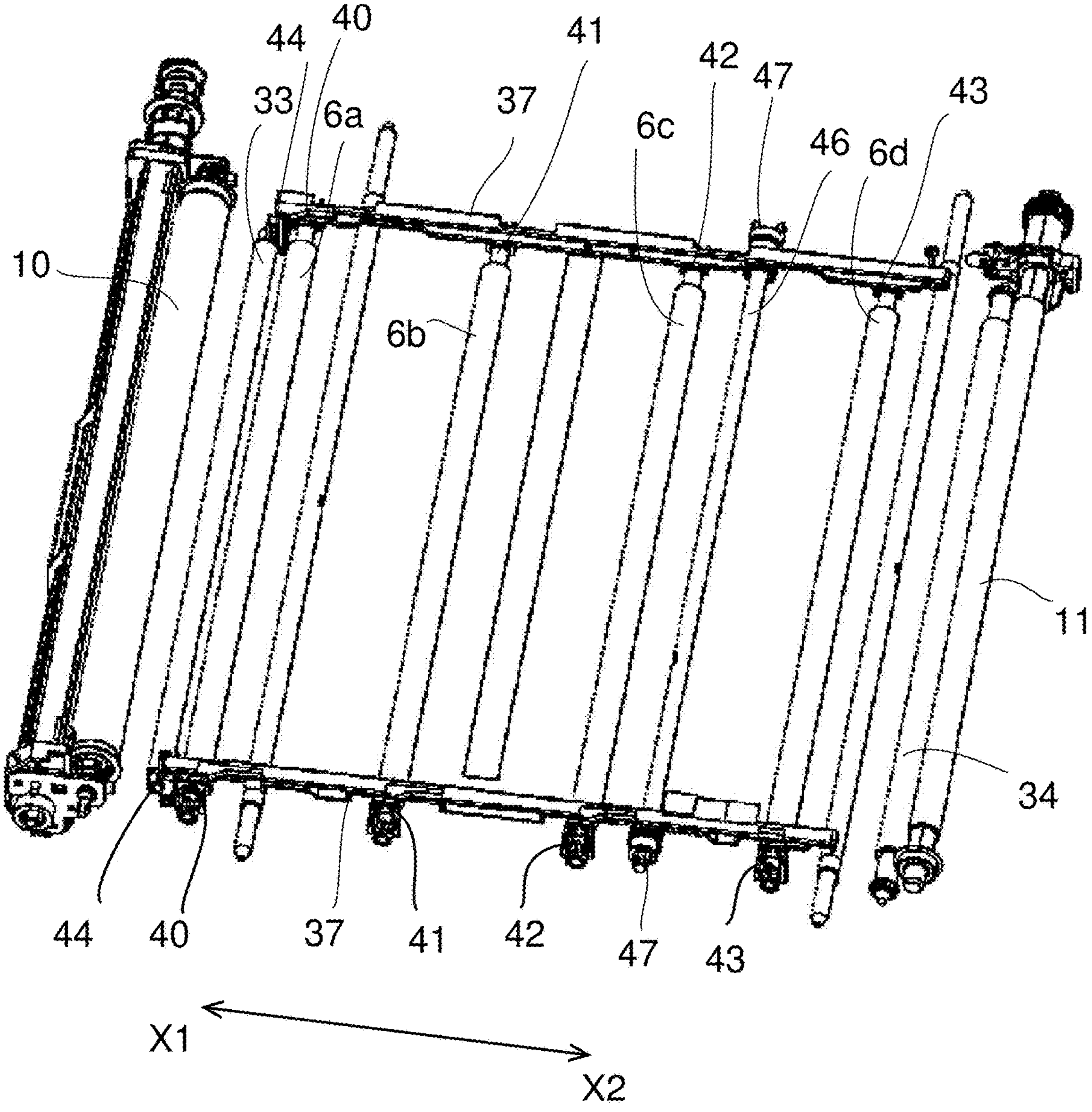
FIG. 3 is a perspective view showing the intermediate transfer unit 30 according to the embodiment of the present disclosure.

FIG. 2 is a perspective view of the intermediate transfer unit (transfer unit) 30 according to the first embodiment of the present disclosure which is included in the image forming apparatus 100 shown in FIG. 1, and FIG. 3 is a perspective view showing the internal structure of the intermediate transfer unit 30 according to the first embodiment.

The intermediate transfer unit 30 includes the unit main body 35 of two side surface frames 31 and an upper surface frame (not shown), a plurality of primary transfer rollers (transfer rollers) 6*a* to 6*d* supported between the side surface frames 31, a tension roller 10, a drive roller 11, a backup roller 33, a guide roller 34, the seamless intermediate transfer belt (transfer belt) 8 tensioned over these rollers, sliders 37, first bearing holders 40 to 43, second bearing holders 44, a shaft 46 and the like.

The sliders 37 are supported to the pair of side surface frames 31 to be able to slide in a horizontal direction (the direction X1-X2 of travel of the intermediate transfer belt 8). The sliders 37 support the first bearing holders 40 to 43 and the second bearing holders 44 such that they can be moved in an up/down direction. The outer ends of the sliders 37 in the axial direction are arranged more inward than the outer portions of the transfer belt 8 in the axial direction. In this way, it is possible to reduce the size of the intermediate transfer unit 30 in the axial direction.

The primary transfer rollers 6*a* to 6*d* are arranged opposite the photosensitive drums (image carrying members) 1*a* to 1*d* through the intermediate transfer belt 8 (see FIG. 1), and sequentially transfer and stack, on the intermediate transfer belt 8, toner images formed on the outer circumferential surfaces of the photosensitive drums (image carrying members) 1*a* to 1*d*. The primary transfer rollers 6*a* to 6*d* are arranged sequentially in the direction X1-X2 of travel of the intermediate transfer belt 8.

The backup roller 33 is provided on an upstream side X1 relative to the primary transfer roller 6*a* arranged most upstream in the horizontal direction (the direction X1-X2 of travel of the intermediate transfer belt 8) so as to be in parallel with the primary transfer roller 6*a*, and is extended parallel to the axis lines of the primary transfer rollers 6*a* to 6*d*.

A pair of first bearing holders 40 rotatably support both ends of the primary transfer roller 6*a*. A pair of first bearing holders 41 rotatably support both ends of the primary transfer roller 6*b*. A pair of first bearing holders 42 rotatably support both ends of the primary transfer roller 6*c*. A pair of first bearing holders 43 rotatably support both ends of the primary transfer roller 6*d*.

Figure 6:
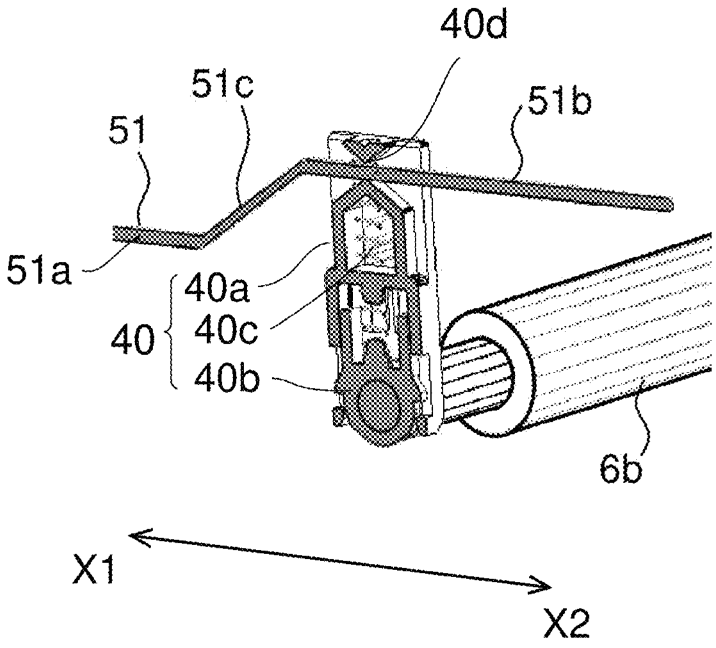
FIG. 6 is an enlarged cross-sectional perspective view showing an area around the first bearing holder 40 in the intermediate transfer unit 30 according to the embodiment of the present disclosure.

More specifically, the first bearing holder 40 includes a holder main body 40*a*, a bearing portion 40*b* and a coil spring 40*c* (see FIG. 6). The holder main body 40*a* is slidably supported to a first step rib 51. The bearing portion 40*b* rotatably supports the primary transfer roller 6*a*. The coil spring 40*c* is arranged between the holder main body 40*a* and the bearing portion 40*b*. The bearing portion 40*b* is biased by the biasing force of the coil spring 40*c* in a direction (downward direction) away from the holder main body 40*a*. Although in the present embodiment, the coil spring 40*c* is provided, the coil spring 40*c* may be omitted.

In an upper end portion of the holder main body 40*a*, a sandwiching portion 40*d* is formed. The sandwiching portion 40*d* is formed by arranging a pair of V-shaped ribs such that the apexes thereof are opposite each other. The sandwiching portion 40*d* sandwiches the first step rib 51 vertically, and thus the holder main body 40*a* is slidably supported to the first step rib 50.

A pair of second bearing holders 44 rotatably support both ends of the backup roller 33. More specifically, the second bearing holder 44 includes a holder main body 44*a* and a bearing portion 40*b* (see FIG. 4). In the holder main body 44*a*, as in the holder main body 40*a*, a sandwiching portion (not shown) is formed, and thus the holder main body 44*a* is slidably supported to a second step rib 54. The bearing portion 44*b* rotatably supports the backup roller 33.

Likewise, the first bearing holder 41 of the primary transfer roller 6*b* is slidably supported to the first step rib 51. The first bearing holder 42 of the primary transfer roller 6*c* is slidably supported to a first step rib 52. The first bearing holder 43 of the primary transfer roller 6*d* is slidably supported to a first step rib 53.

The tension roller 10, the drive roller 11 and the guide roller 34 are rotatably supported to the side surface frames 31.

The shaft 46 is arranged inside the intermediate transfer unit 30, and pinion gears 47 are fixed to both ends of the shaft 46. The shaft 46 is arranged between the primary transfer roller 6*c* and the primary transfer roller 6*d* in the horizontal direction (the direction X1-X2 of travel of the intermediate transfer belt 8), and is extended parallel to the axis lines of the primary transfer rollers 6*a* to 6*d*.

The shaft 46 penetrates the side surface frames 31 (see FIG. 2) to protrude to the outside, and drive input gears (not shown) are fixed in the vicinity of tip ends. A rotational drive force is transmitted from a drive motor (not shown) provided on the side of the main body of the image forming apparatus 100 to the drive input gears via a gear train (not shown).

The pinion gears 47 are arranged in positions in which the pinion gears 47 engage with racks 48 (see FIG. 4) formed on the sliders 37. The pinion gears 47 are rotated forward and backward, and thus the sliders 37 can be reciprocated in the horizontal direction (the direction X1-X2 of travel of the intermediate transfer belt 8). The shaft 46 and the pinion gears 47 constitute a slider drive mechanism which reciprocates the sliders 37.

Figure 4:
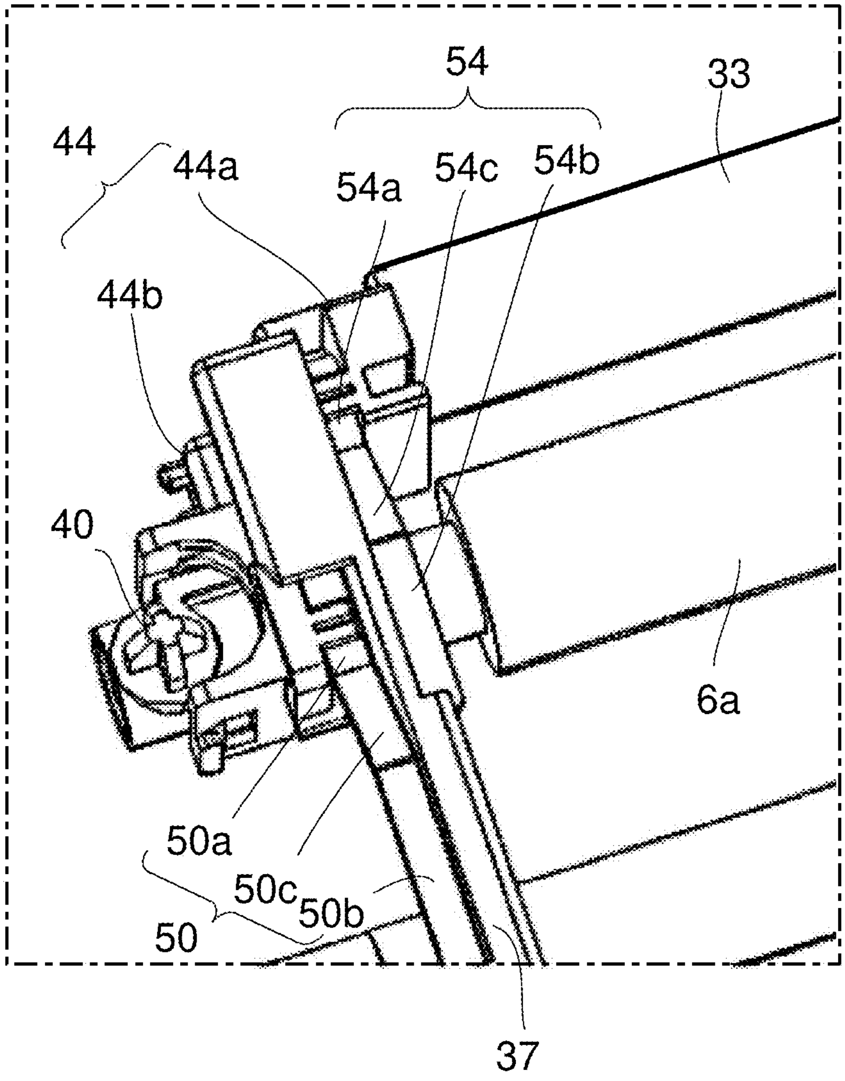
FIG. 4 is an enlarged perspective view showing an area around a first bearing holder 40 in the intermediate transfer unit 30 according to the embodiment of the present disclosure.
Figure 5:
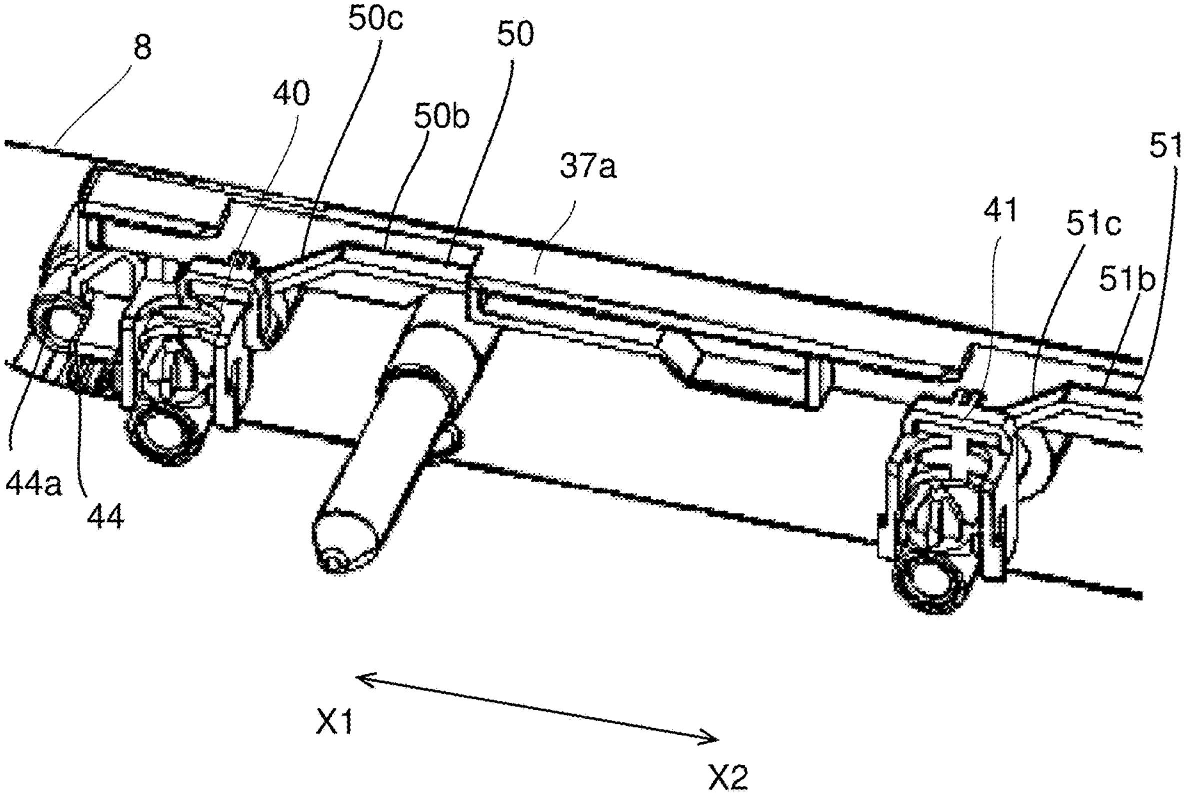
FIG. 5 is an enlarged perspective view showing an area around the first bearing holder 40 in the intermediate transfer unit 30 according to the embodiment of the present disclosure.
Figure 7:
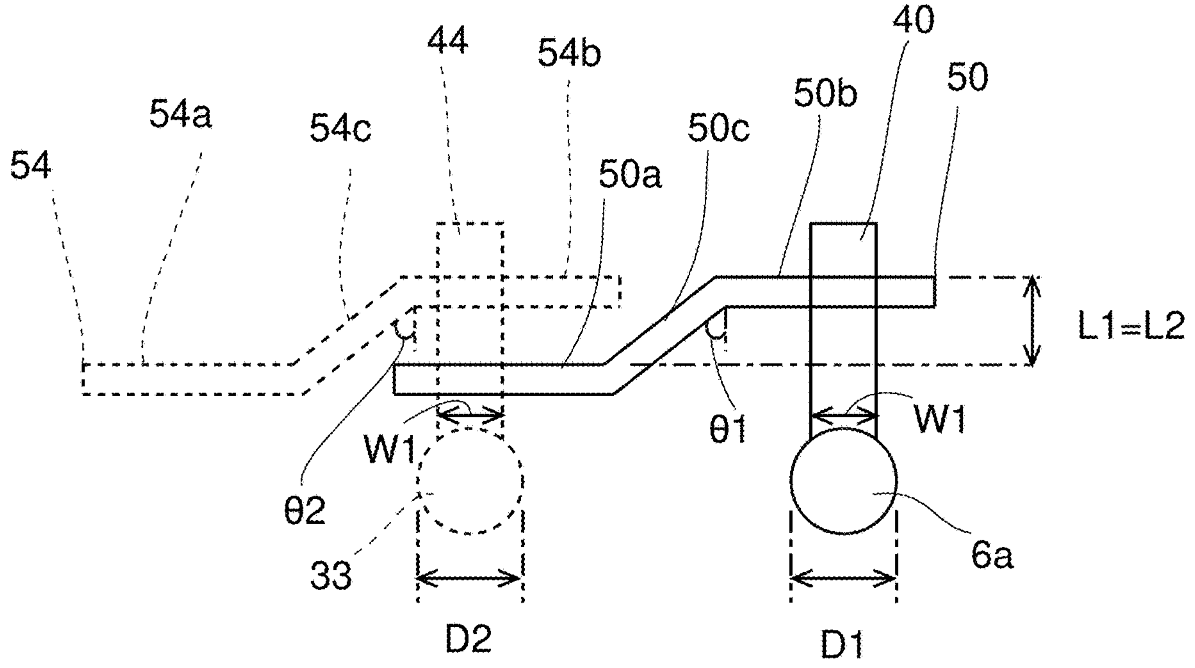
FIG. 7 is an illustrative view for illustrating a positional relationship between the first bearing holder 40 and a second bearing holder 44 in the intermediate transfer unit 30 according to the embodiment of the present disclosure.
Figure 8:
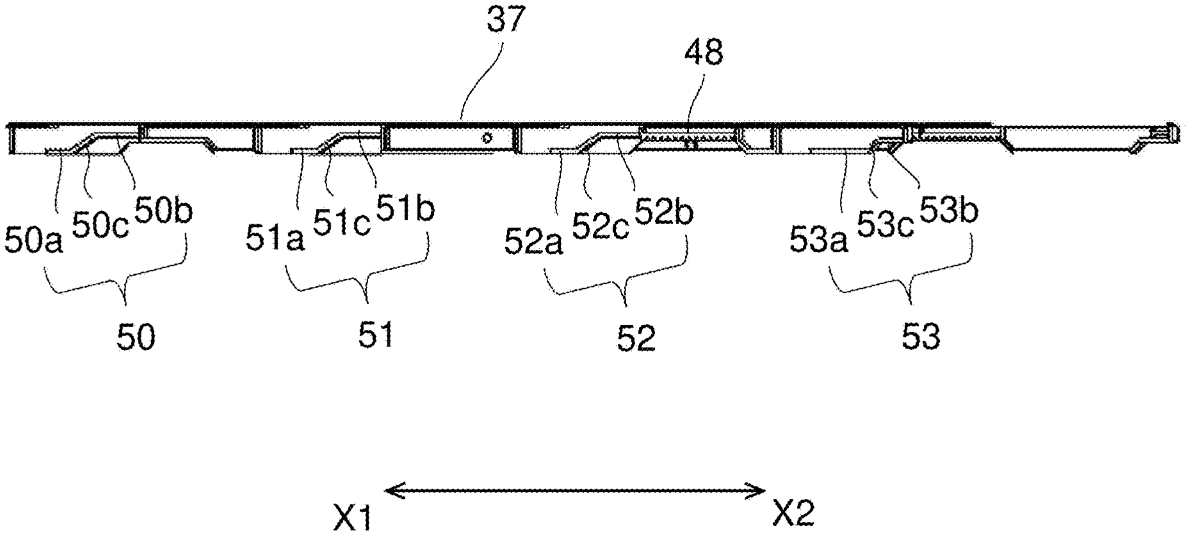
FIG. 8 is a diagram of an outer surface of a slider 37 in the intermediate transfer unit 30 according to the embodiment of the present disclosure.

FIGS. 4 and 5 are enlarged perspective views showing areas around the first bearing holder 40. FIG. 6 is an enlarged cross-sectional perspective view showing an area around the first bearing holder 41. FIG. 7 is an illustrative view for illustrating a positional relationship between the first bearing holder 41 and the second bearing holder 44, and the second bearing holder 44 and the second step rib 54 are indicated by dashed lines. FIG. 8 is a diagram of an outer surface of the slider 37. The pair of sliders 37 are bilaterally symmetrical to have the same configuration.

In the outer surface of the slider 37, the first step ribs 50 to 53 are formed, and in the inner surface of the slider 37, the second step rib 54 is formed (see FIG. 4). The first step ribs 50 to 53 protrude from the outer surface of the slider 37 to the outside. The second step rib 54 protrudes from the inner surface of the slider 37 to the inside.

The first step rib 50 slidably supports the first bearing holder 40. The first step rib 50 includes a first lower portion 50*a*, a first inclination portion 50*c* and a first upper portion 50*b*. The first step rib 51 slidably supports the first bearing holder 41. The first step rib 51 includes a first lower portion 51*a*, a first inclination portion 51*c* and a first upper portion 51*b*. The first step rib 52 includes a first lower portion 52*a*, a first inclination portion 52*c* and a first upper portion 52*b*. The first step rib 53 includes a first lower portion 53*a*, a first inclination portion 53*c* and a first upper portion 53*b*.

The first inclination portions 50*c* to 53*c* are inclined upward as the first inclination portions 50*c* to 53*c* are extended to the downstream side X2 in the horizontal direction (the direction X1-X2 of travel of the intermediate transfer belt 8). The first upper portions 50*b* to 53*b* are extended from the upper ends of the first inclination portions 50*c* to 53*c* to the downstream side X2 in the direction of travel of the intermediate transfer belt 8. The first lower portions 50*a* to 53*a* are extended from the lower ends of the first inclination portions 50*c* to 53*c* to the upstream side X1 in the direction of travel of the intermediate transfer belt 8.

The second step rib 54 slidably supports the second bearing holder 44. The second step rib 54 includes a second lower portion 54*a*, a second inclination portion 54*c* and a second upper portion 54*b* (see FIGS. 4 and 7).

The first step rib 50 arranged most upstream in the direction X1-X2 of travel of the intermediate transfer belt 8 and the second step rib 54 are arranged side by side in the axial direction of the primary transfer roller 6*a*, and overlap each other when viewed in the axial direction. More specifically, the first lower portion 50*a* of the first step rib 50 arranged most upstream in the direction X1-X2 of travel of the intermediate transfer belt 8 and the second upper portion 54*b* of the second step rib 54 overlap each other when viewed in the axial direction.

In this way, the movement region of the primary transfer roller 6*a* and the movement region of the backup roller 33 overlap each other when viewed in the axial direction. Hence, it is possible to reduce the size of the slider 37 in the direction X1-X2 of travel of the intermediate transfer belt 8. In this way, it is possible to reduce the sizes of the intermediate transfer unit 30 and the image forming apparatus 100 including the intermediate transfer unit 30. Here, the movement distances of the primary transfer rollers 6*a* to 6*d* and the backup roller 33 can be secured to predetermined widths. In this way, the inclination angles of the first inclination portion 50*c* and the second inclination portion 54*c* can be formed gently relative to the direction X1-X2 of travel of the intermediate transfer belt 8. Therefore, the primary transfer roller 6*a* and the backup roller 33 can be smoothly moved along the sliders 37. In this way, the primary transfer rollers 6*a* to 6*d* can be stably pressed to the intermediate transfer belt 8.

When as shown in FIG. 7 and viewed in the axial direction, a distance between the rotation axis of the backup roller 33 and the rotation axis of the primary transfer roller 6*a* arranged most upstream in the direction of travel of the transfer belt is P, the diameter of the primary transfer roller 6*a* is D1, the diameter of the backup roller 33 is D2, the width of the first inclination portion 50*c* in the up/down direction is L1, the inclination angle of the first inclination portion 50 relative to the up/down direction is θ1, the width of the second inclination portion 54 in the up/down direction is L2, the inclination angle of the second inclination portion 54*c* relative to the up/down direction is θ2, the maximum width of the first bearing holder 40 in the horizontal direction (the direction X1-X2 of travel of the intermediate transfer belt 8) is W1 and the width of the second bearing holder 44 in the horizontal direction (the direction X1-X2 of travel of the intermediate transfer belt 8) is W2, a formula (1) below is satisfied.

In a cross section orthogonal to the axial direction, the maximum width W1 of the first bearing holder 40 is the length of a part of the first bearing holder 40 whose width in the horizontal direction (the direction X1-X2 of travel of the intermediate transfer belt 8) is the greatest. In a cross section orthogonal to the axial direction, the maximum width W2 of the second bearing holder 44 is the length of a part of the second bearing holder 44 whose width in the horizontal direction (the direction X1-X2 of travel of the intermediate transfer belt 8) is the greatest.

$$D1+D2<P<L1\tan\theta 1+L2\tan\theta 2+W1/2+W2/2 \quad (1)$$

The distance P is determined based on the formula (1), and thus it is possible to further reduce the size of the slider 37 in the direction X1-X2 of travel of the intermediate transfer belt 8 while the primary transfer rollers 6*a* to 6*d* are being stably pressed to the intermediate transfer belt 8.

Figure 9:
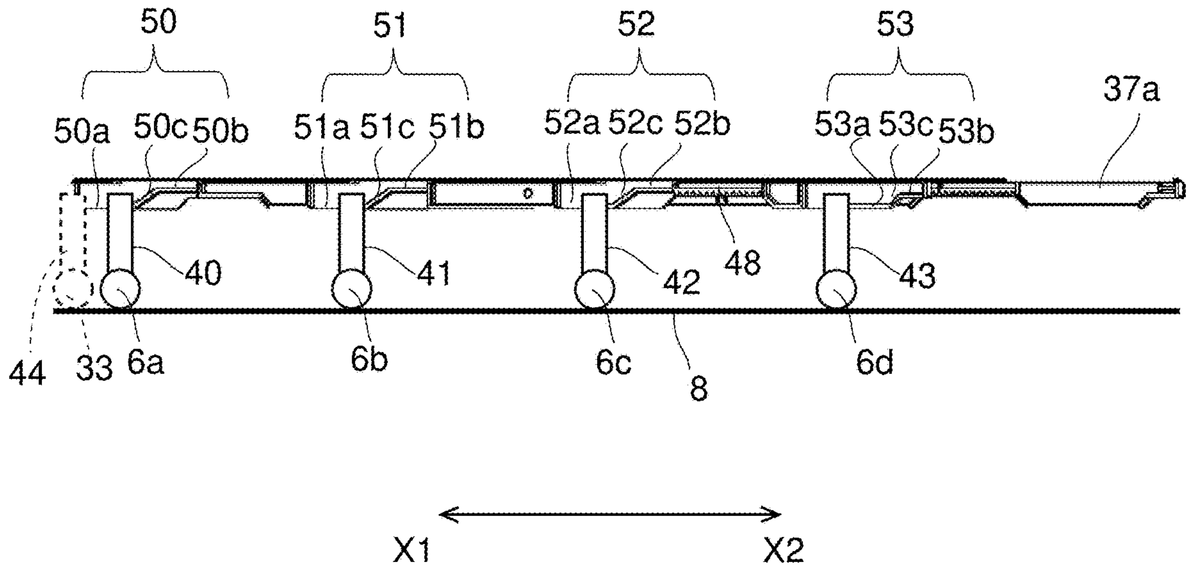
FIG. 9 is an illustrative view for illustrating the operation of first bearing holders 40 to 43 and the second bearing holder 44 in the intermediate transfer unit 30 according to the embodiment of the present disclosure.
Figure 10:
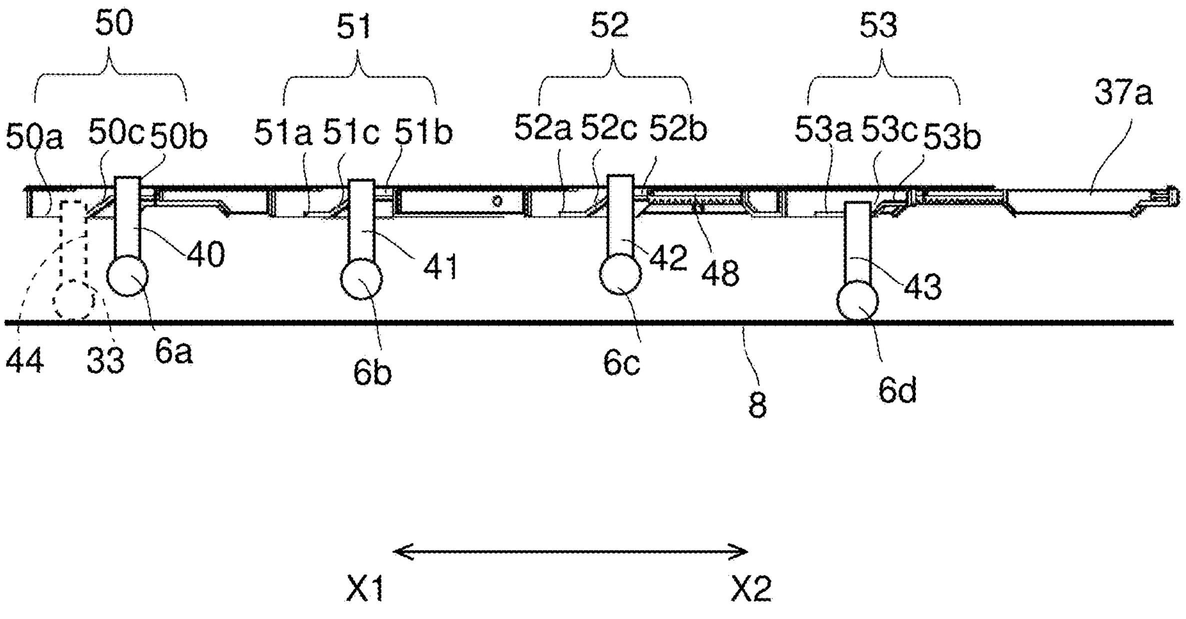
FIG. 10 is an illustrative view for illustrating the operation of the first bearing holders 40 to 43 and the second bearing holder 44 in the intermediate transfer unit 30 according to the embodiment of the present disclosure.
Figure 11:
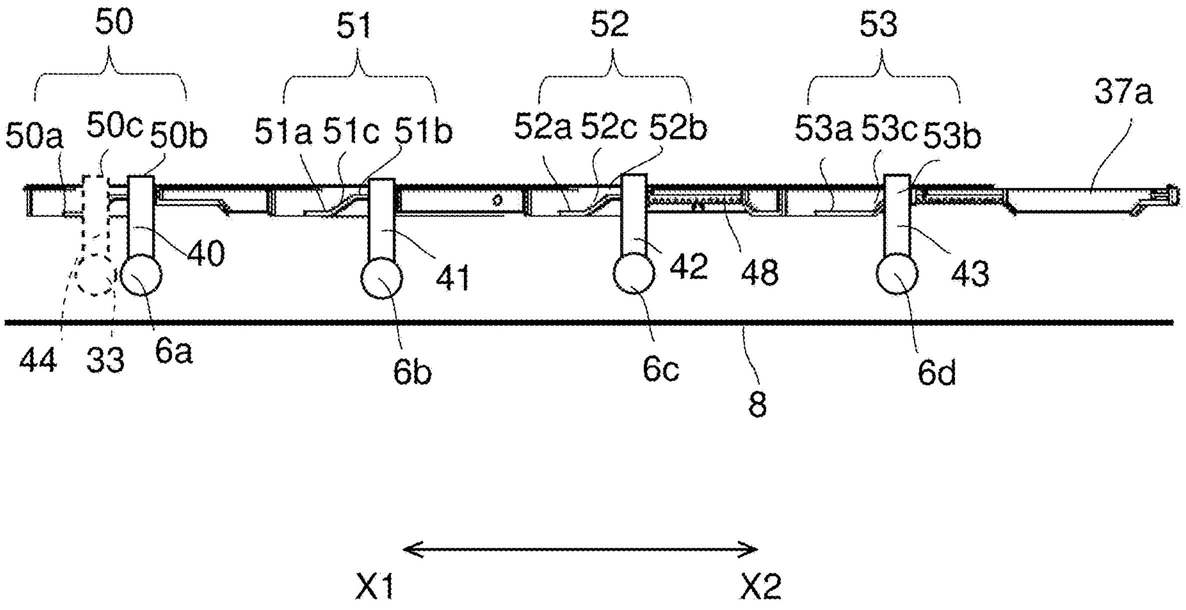
FIG. 11 is an illustrative view for illustrating the operation of the first bearing holders 40 to 43 and the second bearing holder 44 in the intermediate transfer unit 30 according to the embodiment of the present disclosure.

FIGS. 9 to 11 are illustrative views for illustrating the operation of the first bearing holders 40 to 43 and the second bearing holder 44 in a color mode, and the second bearing holder 44 is indicated by dashed lines. FIG. 9 shows a state where the primary transfer rollers 6*a* to 6*d* and the backup roller 33 are in contact with the intermediate transfer belt 8, and FIG. 10 shows a state where the primary transfer rollers 6*a* to 6*c* are away from the intermediate transfer belt 8. FIG. 11 shows a state where the primary transfer rollers 6*a* to 6*d* and the backup roller 33 are away from the intermediate transfer belt 8.

In the color mode where a color image is output, the backup roller 33 presses the intermediate transfer belt 8 in the direction of the photosensitive drums 1*a* to 1*d* (see FIG. 9). Here, the second bearing holder 44 is arranged at the second lower portion 54*a* of the second step rib 54 (see FIGS. 4 and 7). The backup roller 33 presses the intermediate transfer belt 8 downward at a predetermined position, and thus the first bearing holders 40 to 43 are moved downward, with the result that the four primary transfer rollers 6*a* to 6*d* and the backup roller 33 are pressed to the intermediate transfer belt 8.

Here, the first bearing holders 40 to 43 are arranged at the first lower portions 50*a* to 53*a* of the first step ribs 50 to 53.

In a state where the primary transfer rollers 6*a* to 6*d* and the backup roller 33 are in contact with the intermediate transfer belt 8, the compression length of the coil spring 40*c* in each of the first bearing holders 40 to 43 is changed by a drag force from the intermediate transfer belt 8 (see FIG. 6). In this way, a gap is formed between the holder main body 40*a* and the bearing portion 40*b*, and thus the primary transfer rollers 6*a* to 6*d* are pressed to the photosensitive drums 1*a* to 1*d* through the intermediate transfer belt 8 at a predetermined pressure.

In a monochrome mode, the first bearing holders 40 to 42 are moved upward, and the backup roller 33 and the primary transfer roller 6*d* are pressed to the intermediate transfer belt 8 (see FIG. 10). Switching from the color mode to the monochrome mode is performed by rotating the pinion gears 47 in the opposite direction (in the counterclockwise direction in FIG. 3) by a predetermined angle. In this way, the slider 37 slides from the state of FIG. 9 in a leftward direction (to the upstream side X1 in the direction of travel of the intermediate transfer belt 8) by a predetermined amount.

In this way, the first bearing holders 40 to 42 are moved from the first lower portions 50*a* to 52*a* of the first step ribs 50 to 52 through the first inclination portions 50*c* to 52*c* to the first upper portions 50*b* to 52*b*. On the other hand, the second bearing holder 44 remains at the second lower portion 54*a* of the second step rib 54. The first bearing holder 43 remains at the first lower portion 53*a* of the first step rib 53. In this way, only the primary transfer roller 6*d* is pressed to the photosensitive drum 1*d* through the intermediate transfer belt 8. Hence, image formation is performed using only the image formation unit Pd for black which outputs a monochrome image.

Although in the present embodiment, the backup roller 33 is in contact with the intermediate transfer belt 8 in the monochrome mode, the backup roller 33 may be away from the intermediate transfer belt 8.

When the slider 37 is reciprocated in the direction of travel of the intermediate transfer belt 8, timing with which the backup roller 33 is moved toward and away from the intermediate transfer belt 8 is preferably different from timing with the primary transfer rollers 6*a* to 6*d* are moved toward and away from the intermediate transfer belt 8. In this way, in the switching between the monochrome mode and the color mode, the primary transfer rollers 6*a* to 6*d* can be stably pressed to the intermediate transfer belt 8.

Since in the monochrome mode, the primary transfer rollers 6*a* to 6*d* are away from the intermediate transfer belt 8, dirt on the intermediate transfer belt 8 caused by residual toners on the surfaces of the photosensitive drums 1*a* to 1*c* can be prevented. It is also possible to suppress an increase in the drive torque of the drive roller 11 for turning the intermediate transfer belt 8.

In a standby mode, the backup roller 33 and the primary transfer roller 6*d* are moved upward. In this way, the backup roller 33 and the primary transfer rollers 6*a* to 6*d* are away from the intermediate transfer belt 8 (see FIG. 11). Switching from the monochrome mode to the standby mode is performed by further rotating the pinion gears 47 in the opposite direction (in the counterclockwise direction in FIG. 3) by a predetermined angle. In this way, the slider 37 slides from the state of FIG. 10 in the leftward direction (to the upstream side X1 in the direction of travel of the intermediate transfer belt 8) by a predetermined amount.

In the standby mode, the primary transfer rollers 6*a* to 6*d* and the backup roller 33 are away from the intermediate transfer belt 8, and thus a tension applied to the intermediate transfer belt 8 is decreased, with the result that deformation and elongation of the intermediate transfer belt 8 can be prevented.

When the standby mode transitions to the color mode, the slider 37, the first bearing holders 40 to 43 and the second bearing holder 44 are operated in a manner opposite to the operation described above. A position detection sensor (not shown) is used to detect the amount of rotation (rotation angle) of the pinion gears 47, and thus it is possible to accurately control the amount of movement and the direction of movement of the slider 37.

The present disclosure is not limited to the embodiment described above, and various changes can be made without departing from the spirit of the present disclosure. For example, the order of the arrangement of the image formation units Pa to Pd corresponding to the colors of yellow, cyan, magenta and black can be set arbitrarily. In the embodiment described above, in the first bearing holders 40 to 43 and the second bearing holder 44, the sandwiching portions 40*d* for sandwiching the first step ribs 50 to 53 and the second step rib 54 are formed. In the present disclosure, the first bearing holders 40 to 43 and the second bearing holder 44 may be slidably supported by another structure to the first step ribs 50 to 53 and the second step rib 54.

Although here, the description has been given using the example of the color printer as the image forming apparatus 100 including the intermediate transfer unit 30 of the present disclosure, the present disclosure can be applied to various image forming apparatuses, such as a color copying machine and a facsimile, which use a transfer unit including a seamless transfer belt and a plurality of transfer rollers. For example, the present disclosure can be applied to a transfer unit included in a color image forming apparatus of a direct transfer system in which a sheet is held on a seamless transfer belt and conveyed and toner images of colors formed in image formation units are directly transferred to the sheet.

Although the embodiment of the present disclosure has been described, the present disclosure is not limited to the embodiment, and the present disclosure can be implemented by adding various changes without departing from the spirit of the present disclosure.

The present disclosure can be utilized in an intermediate transfer unit which includes a seamless intermediate transfer belt and an image forming apparatus.

What is claimed is:

1. A transfer unit comprising:

a seamless transfer belt that is moved along a direction in which a plurality of image carrying members are arranged;

a plurality of transfer rollers that are arranged opposite the image carrying members through the transfer belt, and sequentially transfer and stack, on the transfer belt, toner images formed on outer circumferential surfaces of the image carrying members;

a backup roller that is provided on an upstream side relative to the transfer roller arranged most upstream in a direction of travel of the transfer belt so as to be in parallel with the transfer roller, and is extended parallel to an axis line of the transfer roller;

a plurality of pairs of first bearing holders, each pair rotatably supporting both ends of a corresponding one of the transfer rollers;

a pair of second bearing holders that rotatably support both ends of the backup roller; and a pair of sliders that are supported to be able to be reciprocated in the direction of travel of the transfer belt and support the pairs of first bearing holders and the pair of second bearing holders, wherein each of the sliders includes a plurality of first step ribs that slidably support the first bearing holders and a second step rib that slidably supports the second bearing holder, each of the first step ribs includes a first inclination portion that is inclined upward as the first inclination portion is extended to a downstream side in the direction of travel of the transfer belt, a first upper portion that is extended from an upper end of the first inclination portion to the downstream side in the direction of travel of the transfer belt and a first lower portion that is extended from a lower end of the first inclination portion to the upstream side in the direction of travel of the transfer belt, the second step rib includes a second inclination portion that is inclined upward as the second inclination portion is extended to the downstream side in the direction of travel of the transfer belt, a second upper portion that is extended from an upper end of the first inclination portion to the downstream side in the direction of travel of the transfer belt and a second lower portion that is extended from a lower end of the first inclination portion to the upstream side in the direction of travel of the transfer belt, each of the sliders is reciprocated such that each of the first bearing holders slides on a corresponding one of the first step ribs to be reciprocated in a direction toward and away from the transfer belt and the second bearing holder slides on the second step rib to be reciprocated in the direction toward and away from the transfer belt and the first step rib arranged most upstream in the direction of travel of the transfer belt and the second step rib are arranged side by side in an axial direction of the transfer roller, and overlap each other when viewed in the axial direction.

2. The transfer unit according to claim 1, wherein the first lower portion arranged most upstream in the direction of travel of the transfer belt and the second upper portion overlap each other when viewed in the axial direction.

3. The transfer unit according to claim 1, wherein outer ends of the sliders in the axial direction are arranged more inward than outer portions of the transfer belt in the axial direction.

4. The transfer unit according to claim 1, wherein when in a cross section orthogonal to the axial direction, a distance between a rotation axis of the backup roller and a rotation axis of the transfer roller arranged most upstream in the direction of travel of the transfer belt is P, a diameter of the transfer roller is D1, a diameter of the backup roller is D2, a width of the first inclination portion in an up/down direction is L1, an inclination angle of the first inclination portion relative to the up/down direction is θ1, a width of the second inclination portion in the up/down direction is L2, an inclination angle of the second inclination portion relative to the up/down direction is θ2, a maximum width of the first bearing holder in the direction of travel of the transfer belt is W1 and a maximum width of the second bearing holder in the direction of travel of the transfer belt is W2, a formula (1) below is satisfied.

$$D1 + D2 < P < L1\tan\theta1 + L2\tan\theta2 + W1/2 + W2/2 \qquad (1)$$

5. The transfer unit according to claim 1, wherein when the slider is reciprocated in the direction of travel of the transfer belt, timing with which the backup roller is moved toward and away from the transfer belt is different from timing with the transfer roller is moved toward and away from the transfer belt.

6. An image forming apparatus comprising:

the transfer unit according to claim 1.

* * * * *